P. E. HOLT.
TRACTION ENGINE.
APPLICATION FILED JAN. 6, 1914.
1,309,578.
Patented July 8, 1919.
2 SHEETS—SHEET 2.
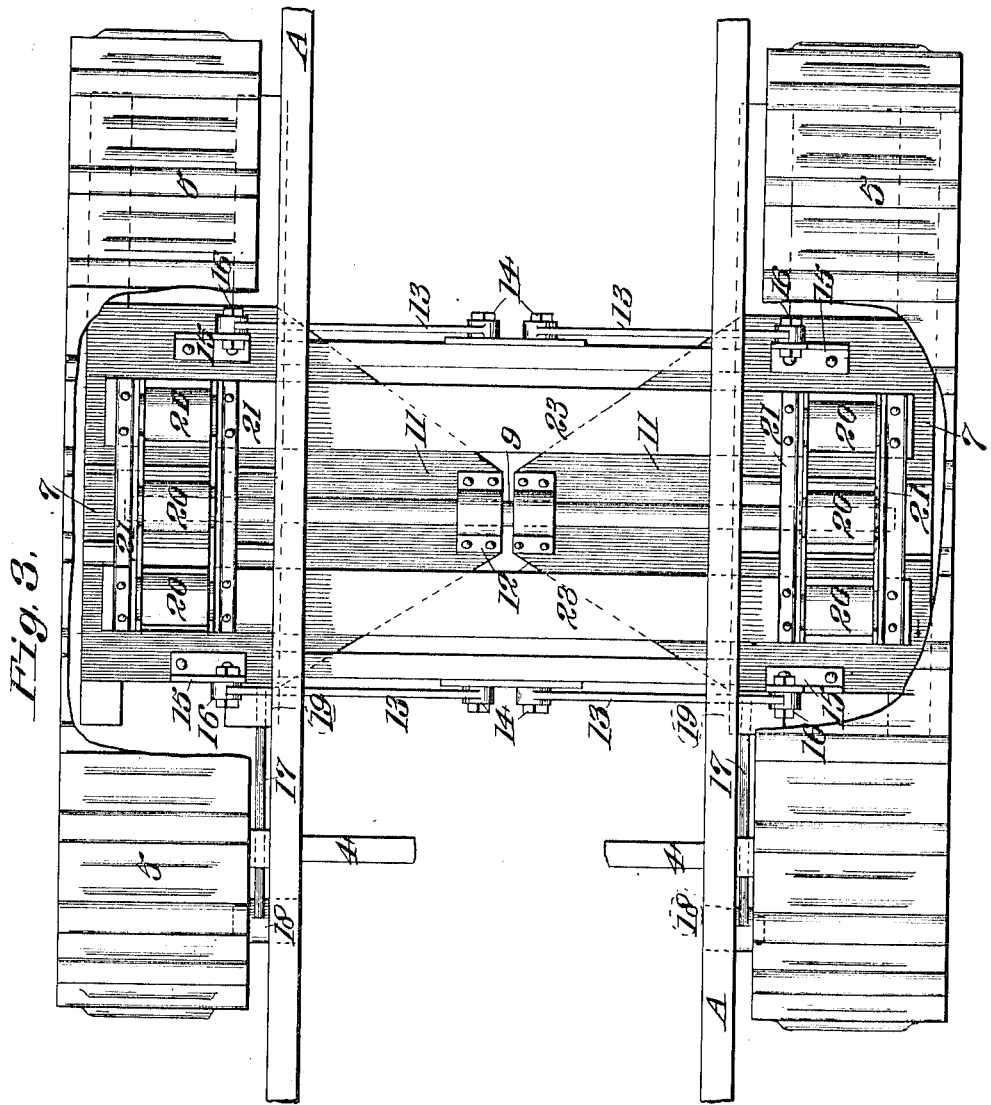
WITNESSES:
Charles Pickles
Thos Eastberg
INVENTOR
Pliny E. Holt.
BY G. H. Strong.
ATTORNEY

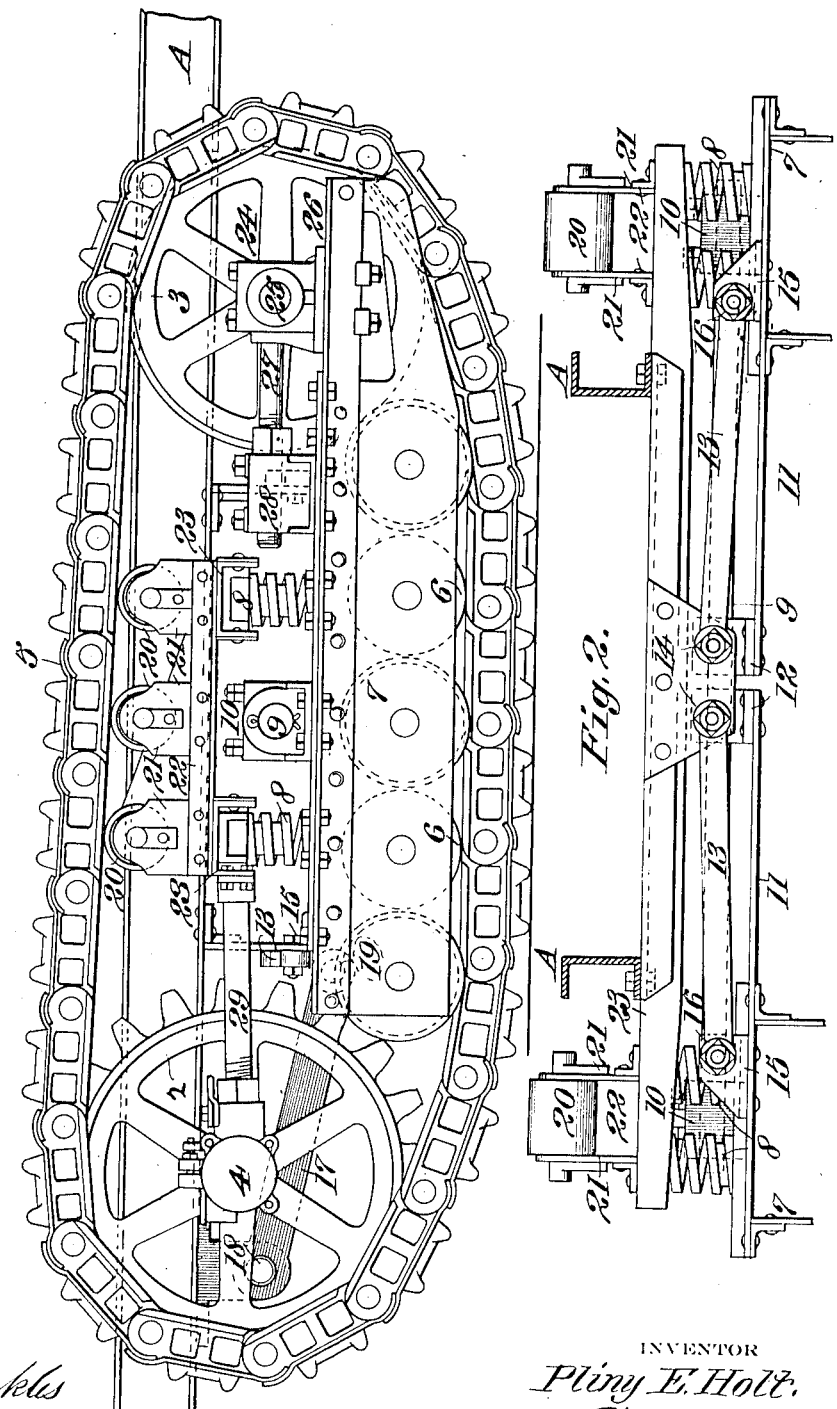

UNITED STATES PATENT OFFICE.

PLINY E. HOLT, OF STOCKTON, CALIFORNIA.

TRACTION-ENGINE.

1,309,578. Specification of Letters Patent. Patented July 8, 1919.

Application filed January 6, 1914. Serial No. 810,671.

*To all whom it may concern:*

Be it known that I, PLINY E. HOLT, a citizen of the United States, residing at Stockton, in the county of San Joaquin and State of California, have invented new and useful Improvements in Traction-Engines, of which the following is a specification.

This invention relates to traction engines of the self-laying track variety and of the type shown in United States Letters Patent #1,026,037, May 14, 1912.

The object and advantages of the present invention will be apparent hereinafter.

The invention consists of the parts and the combination and construction of parts as hereinafter more fully described and claimed, having reference to the accompanying drawings, in which—

Figure 1 is a side elevation of the self-laying track viewed from the right-hand side of the machine, illustrating a part of the invention.

Fig. 2 is a cross section showing the pivoted radius rods for maintaining the alinement of the trucks.

Fig. 3 is a plan view of a fragment of the running gear.

In the present instance I have not thought it necessary to illustrate the entire traction engine or machine, but simply enough of the same to show the essential features of the present invention.

A represents the main frame of the traction engine; 2 the rear driving sprocket; 3 the front idler; 4 the drive shaft for the sprocket 2 mounted on the main frame of the vehicle; 5 the endless jointed self-laying track passing around the wheels 2—3 and beneath the track rollers 6 which are mounted in the truck 7. The load is yieldingly supported on the truck and track by the springs 8. It is understood that there are two of these trucks 7, one on each side of the machine, and they are connected by a shaft 9 turning in boxes 10 on the shaft, and each truck has a top plate with a laterally and inwardly projecting triangular portion 11, which has a box 12 through which box the shaft 9 loosely turns.

The shaft 9 keeps the trucks spaced and upright, while the proper alinement and parallelism of the trucks is maintained by the radius rods 13 which are pivoted respectively at their inner ends, as shown at 14, to the transverse rods or ties of the main frame. The outer ends of the radius rods 13 are pivoted respectively at the points 16 to angle brackets 15 mounted on the triangular portions 11 of the trucks and on either side of the shaft 9. 17 is a link forming a thrust bar and spacer bar which is pivoted at one end as shown at 18 to the main frame adjacent to the drive shaft 4, and the forward end of the link 17 is pivoted at 19 to a respective truck, and operates to hold the truck properly forward of the sprocket wheel 2; it being understood that the truck is bifurcated to allow the sprocket wheel 2 to revolve. The top plane of the track belt 5 is supported between the wheels 2—3 on rollers 20 which are journaled on brackets 21 mounted on a bed plate 22, which in turn is supported on inverted cross channels 23. The channels 23 extend across the machine and under the side sills A, and form seats for the upper ends of the springs 8. Thus the entire load of the vehicle is supported on these channels by the springs 8.

The present invention has particularly to do with the mounting of the truck 7 and its arrangement with respect to the rear driving sprocket 2 and the front idler 3. It has been customary in the form of engine shown in the aforementioned Patent, #1,026,037, to mount both the wheels 2—3 directly on the vehicle frame and have them both detached from the spring supporting truck 7.

In the present case it is noted that I mount the front idler 3 direct on the truck 7; thus removing the front idler 3 from the vehicle frame itself and support it on the forward extension on the truck, the truck still remaining independent of the rear drive sprocket 2. The boxes 24 for the shaft 25 of the idler 3 are slidably mounted on guides 26 on the truck and adjustment properly maintained by the push rods 27 adjustable in boxes 28 secured on the top of the truck 7. By this construction the idler 3 partakes of all the motions of the truck rising and falling and rocking with it, so that the tendency to back lash and lost motion in the flexible tractor 5 is lessened more than where both the front and rear sprockets are independent of the spring truck. The thrust bar 17 maintains the trucks in proper relation to the rear sprocket and enables the truck to rock and yield bodily at all points in its length. Thrust bar 17 performs also another important function in that it allows the endless, self-laying track to contract endwise; that is, for the front sprocket 3 to be drawn toward the rear driving sprocket 4 whenever a rock, or an excess accumulation of sand or gravel or other foreign material gets into the track and between the track and either of the sprockets 2 or 3; the truck and bar 17 under such conditions and resultant stresses buckling downward and forcing the machine frame upward, thereby allowing the obstruction to be cared for without breakage to the machine. Yielding of the truck in this manner is due primarily to the fact that the truck is pivotally connected with the main frame on an axis located at a point beyond all of the rollers, thereby permitting all of the rollers to yield upwardly in unison in a vertical plane. In the present instance the point 18, where the truck is pivotally connected with the main frame, is located in the rear of the truck 7 and the rollers 6, so that, when traction conditions require it, the truck may yield upwardly at all points of contact with the ground run of the track belt. The adjustment of the driving sprocket 2 is effected by a push rod 29 seating against the rear cross channel 23.

Another reason for mounting the front idler 3 on the truck frame rather than on the vehicle frame, is to relieve the vehicle frame of shocks and strains due to the travel of the vehicle over a rough or uneven ground. With the present construction the machine may go into and out of a ditch or down a side hill at an incline, and the track will follow the incline of the ground, adjusting itself more readily to any inequalities where the wheel 3 is mounted on the spring truck rather than where the wheel 3 has a rigid support on the vehicle frame.

Having thus described my invention what I claim and desire to secure by Letters Patent is—

1. In a vehicle, the combination of a main frame, a resilient load supporting means for said frame including a roller truck, an endless, flexible track belt supporting said truck, a driving wheel journaled on the main frame and supporting one end of the track belt, an idler journaled on the truck and supporting the other end of the track belt, and pivotal means whereby said roller truck is connected to the main frame at a point beyond all the rollers to permit all of said rollers and the idler to yield simultaneously upwardly in a vertical direction.

2. In a vehicle, the combination of a main frame, a resilient load supporting means for said frame including a roller truck, an endless, flexible track belt supporting said truck, a rear driving wheel journaled on the main frame and supporting the rear end of the track belt, a front idler journaled on the truck and supporting the other end of the track belt, and pivotal means whereby said roller truck is connected to the main frame at a point beyond all the rollers to permit all of said rollers and the idler to yield simultaneously upwardly in a vertical direction.

3. In a vehicle, the combination of a main frame, an endless flexible track belt, a driving wheel journaled in the main frame and supporting one end of the track belt, a truck having rollers bearing on the ground run of the track belt, an idler journaled on the truck and supporting the other end of the track belt, springs interposed between the truck and frame whereby the frame is yieldingly supported by the truck, and a link pivoted at one end to the truck and at its other end to a fixed part of the main frame, whereby all of the rollers and the idler may yield simultaneously upwardly in a vertical plane.

4. In a vehicle, the combination of a main frame, an endless flexible track belt, a rear driving wheel journaled on the frame and supporting the rear end of the track belt, a truck having rollers bearing on the ground run of the track belt, a front idler journaled on the truck and supporting the other end of the track belt, springs interposed between the truck and the main frame whereby the frame is yieldingly supported by the truck, and a link connected at one end to the rear end of the truck and pivoted at its other end to a fixed part of the main frame with the axis of oscillation of the truck beyond all of the rollers and idler whereby all of the rollers and idler may yield simultaneously upwardly in a vertical plane.

5. In a vehicle, the combination of a main frame, a load supporting means for said frame including a roller truck, an endless, flexible track belt supporting said truck, a driving wheel journaled on the main frame and supporting one end of the track belt, an idler journaled on the truck and supporting the other end of the track belt, and pivotal means whereby said roller truck is connected to the main frame at a point beyond all the rollers to permit all of said rollers and the idler to yield simultaneously upwardly in a vertical direction.

6. In a vehicle, the combination of a main frame, a load supporting means for said frame including a roller truck, an endless, flexible track belt supporting said truck, a rear driving wheel journaled on the main frame and supporting the rear end of the track belt, a front idler journaled on the truck and supporting the other end of the track belt, and pivotal means whereby said roller truck is connected to the main frame at a point beyond all the rollers to permit all of said rollers and the idler to yield simultaneously upwardly in a vertical direction.

7. In a vehicle, the combination of a main frame, a load supporting means for said frame including a roller truck, springs interposed between the truck and the frame, an endless flexible track belt supporting said truck, a driving wheel journaled in the main frame and supporting one end of the track belt, an idler journaled on the truck and supporting the other end of the track belt, and pivotal means whereby said roller truck is connected to the main frame at a point beyond all the rollers to permit all of said rollers and the idler to yield simultaneously upwardly in a vertical direction.

8. In a vehicle, the combination of a main frame, a load supporting means for said frame including a roller truck, springs interposed between the truck and the frame, an endless, flexible track belt supporting said truck, a rear driving wheel journaled in the main frame and supporting the rear end of the track belt, a front idler journaled on the truck and supporting the other end of the track belt, and pivotal means whereby said roller truck is connected to the main frame at a point beyond all the rollers to permit all of said rollers and the idler to yield simultaneously upwardly in a vertical direction.

9. In a vehicle, the combination with its frame, of a pair of rotatable driving and supporting wheels, one of said wheels mounted on the frame, the other mounted on the truck capable of a limited movement lengthwise of the frame toward and from the wheel which is stationarily mounted on the frame, an endless, flexible self-laying track passing around said wheels, and menas for automatically producing slack in the endless track to permit all obstructions, such as stones or other foreign material to be carried around the course of travel of the track and between the track and driving and supporting wheels.

10. In a vehicle employing an endless, self-laying track, the combination of a main frame, a driving sprocket mounted thereon, a truck on which the frame is yieldingly supported, said truck capable of a limited lengthwise movement toward and from the driving sprocket, a front idler sprocket mounted on the forward end of the truck, an endless, flexible track passing around the two sprockets, and means acting normally to maintain the track in alinement and out of interference with the driving sprocket and yet capable of allowing the front sprocket to move toward the rear sprocket and create slack in the chain in the event dirt, stones or other foreign material is carried by the track in the course of its travel around either of said wheels.

11. In a vehicle of the self-laying track variety, the combination of a main frame, a driving sprocket mounted thereon, a spring truck on which the frame is mounted, a front idler sprocket on the truck frame, an endless self-laying track passing around the two sprockets and truck frame, rollers on the truck frame running upon rails of the track, and a push bar member having a fulcrum on the main frame and a pivotal connection with the truck at a point below the horizontal plane of said fulcrum connection with the main frame whereby the push bar normally maintains the truck in proper position in advance of the rear sprockets and yet allows the truck and front sprocket to approach the rear sprocket and provide slack in the chain in the event the pitch line of either of said wheels with the chain track is increased.

12. In a vehicle of the self-laying track variety, the combination of a main frame, front and rear sprockets, an endless self-laying track passing around said sprockets, a truck within the endless self-laying track and carrying one of said sprockets, said truck and its said sprocket capable of a limited movement lengthwise of the frame toward the other sprocket, and an angularly disposed push bar having one end pivoted to the main frame and the other end pivoted to the truck, the point of connection of said push bar with the main frame being above and rearward of the point of connection of the push bar with the truck and between the last-mentioned sprocket and said point of connection of said push bar with the truck, said push bar operating normally to maintain the truck and said sprockets in proper relative position and permitting a limited movement of the truck and its sprocket lengthwise of and relative to the main frame on the lifting of the main frame.

13. In a vehicle, the combination with its frame, of a rear sprocket and a front idler, an endless, flexible track traveling around said rear sprocket and front idler, a roller truck within said track and traveling on the ground run thereof and on which said front idler is mounted, and link connections between the rear end of said truck and the vehicle frame to permit the truck and its front idler to have a limited rearward movement toward the said sprocket wheel for automatically producing slack in the endless chain track to permit obstructions, such as dirt, stones or other foreign material, to be carried around the course of travel of the chain track and between the track and said sprocket and front idler.

In testimony whereof I have hereunto set my hand in the presence of two subscribing witnesses.

PLINY E. HOLT.

Witnesses:
RUSSELL S. SPRINGER,
ELLA I. CHISHOLM.